(12) United States Patent
Novales et al.

(10) Patent No.: US 8,538,791 B2
(45) Date of Patent: Sep. 17, 2013

(54) CAPACITY BASED PROCESS JOB LAYOUT DISTRIBUTION

(75) Inventors: Andrés del Campo Novales, Copenhagen (DK); Conrad Josef Volkmann, Copenhagen (DK); Andre Miguel Coelao Oliveira Rodrigues, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 104 days.

(21) Appl. No.: 13/189,040

(22) Filed: Jul. 22, 2011

(65) Prior Publication Data

US 2013/0024234 A1    Jan. 24, 2013

(51) Int. Cl.
*G06Q 10/00*    (2012.01)

(52) U.S. Cl.
USPC ........................................ 705/7.11; 705/7.15

(58) Field of Classification Search
USPC ............................... 705/7.11, 7.15
See application file for complete search history.

(56) References Cited

U.S. PATENT DOCUMENTS

| | | | |
|---|---|---|---|
| 5,442,561 A | 8/1995 | Yoshizawa et al. | |
| 5,993,041 A | 11/1999 | Toba | |
| 6,370,509 B1 * | 4/2002 | Ross et al. | 705/7.25 |
| 7,236,844 B1 | 6/2007 | Bai et al. | |
| 7,406,358 B2 * | 7/2008 | Preiss | 700/99 |
| 8,033,380 B2 * | 10/2011 | Tsujihama et al. | 198/411 |
| 2002/0069096 A1 | 6/2002 | Lindoerfer et al. | |
| 2003/0014314 A1 | 1/2003 | Griep et al. | |
| 2004/0210467 A1 | 10/2004 | Yokoyama | |
| 2008/0301546 A1 * | 12/2008 | Moore et al. | 715/243 |
| 2010/0082138 A1 * | 4/2010 | Hayes et al. | 700/99 |

OTHER PUBLICATIONS

"LeanKit Kanban" web page downloaded from http://leankitkanban.com/Home/Features on Dec. 26, 2012 from the website www.archive.org as the LeanKit Kanban website existed on or about May 15, 2011.*
Chaharsooghi, et al., "Determination of the Number of Kanbans and Batch Sizes in a JIT Supply Chain System", Retrieved at <<http://www.scientiairanica.com/PDF/Articles/00001501/charsooghi.pdf>>, Department of Industrial Engineering, vol. 17, No. 2, Dec. 2010, pp. 143-149.
Suri, et al., "How to Plan and Implement POLCA", Retrieved at <<http://www.meteconline.org/resources/S0600257_POLCA.pdf>>, Technical Report, Center for Quick Response Manufacturing, May 2003, pp. 17.
"Sharpen your pencils", Retrieved at <<http://www.diskover.eu/116.html>>, Retrieved Date: May 18, 2011, pp. 6.

* cited by examiner

Primary Examiner — Mark A Fleischer
(74) Attorney, Agent, or Firm — Turk IP Law, LLC

(57) ABSTRACT

Production flows/processes are presented through a layout distribution of kanban job symbols (cards, representing production tasks/jobs) in a sequence of execution inside several planning periods. A smart layout distribution algorithm displays a schedule consistent of planning periods and kanban job symbols planned in the planning periods. In addition to a variety of color, textual, graphic, and shading schemes, as well as, icons for providing visual information on the tasks/jobs, the algorithm fits the kanban job symbols within the user interface without scroll bars with a resizable control, and maintains kanban job symbol size proportional to capacity consumed, consistent across planning periods even if the planning periods have different total capacity or are overloaded.

19 Claims, 13 Drawing Sheets

CAPACITY BASED PROCESS JOB LAYOUT DISTRIBUTION

BACKGROUND

A production flow includes a sequence of connected activities. They are a depiction of a sequence of operations, declared as work of a person, a group of persons, an organization of staff, or one or more simple or complex mechanisms. For control purposes, activities may be a view on performed work under a particular aspect, thereby serving as a virtual representation of the performed work. The flow being described may often refer to a document that is being transferred from one step to another. In software engineering, production flow/process refers to detailed code specifications for running and coordinating a sequence of events. It can be a simple, linear sequence—the linear flow chart, for example—or a conditional, many-branched series of events linked together and interacting within complex feedback loops.

Production flows or processes are also associated with job scheduling and capacity considerations. A sequence of process activities is planned over time considering delivery deadlines, available resources, capacity, and similar aspects. Planning periods may have different total available capacity each, and planning periods can also be overloaded—having more than their standard total available capacity. Thus, presentation of job scheduling production flows or processes without addressing capacity aspects is incomplete and may degrade user experience.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to presentation of business processes through a process job layout distribution in a sequence of execution inside several planning periods. A smart layout distribution algorithm according to embodiments may display a schedule consistent of planning periods and job icons planned in the planning periods. According to some embodiments, kanbans job symbols (cards, representing activities/jobs) may be employed for visual presentation, but embodiments are not limited to kanban job symbols. In addition to a variety of color, textual, graphic, and shading schemes, as well as, icons for providing visual information on the tasks/jobs, the algorithm may fit the job icons within the user interface without scroll bars with a resizable control, and maintain the job symbol size proportional to capacity consumed, consistent across planning periods even if the planning periods have different total capacity or are overloaded.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
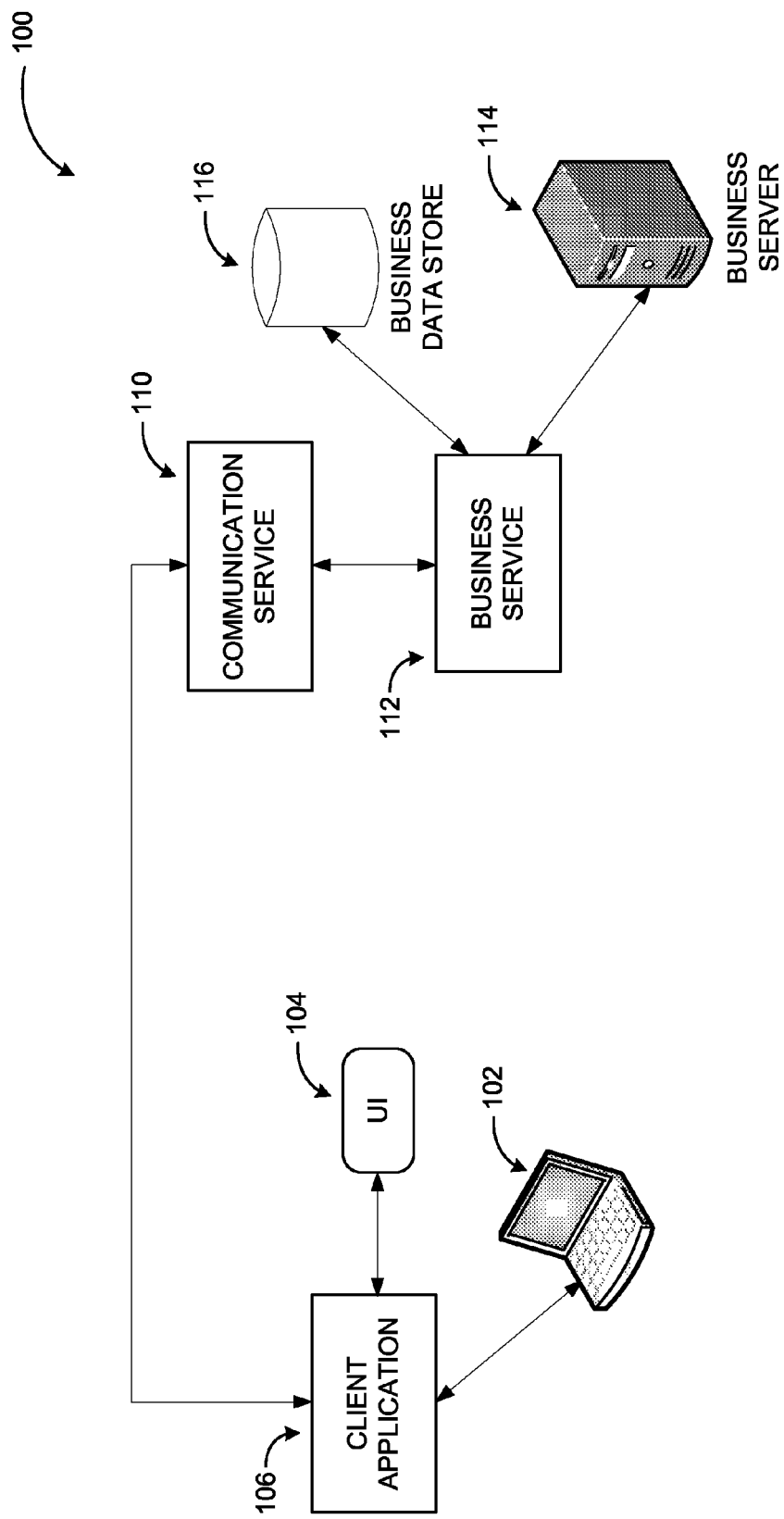
FIG. 1 is a conceptual diagram illustrating interactions between a networked business service providing capacity based process job layout distribution.

As briefly described above, a layout distribution of kanban jobs in a sequence of execution inside several planning periods may be used to present a production schedule for a resource group or a lean work cell. The kanban jobs may be visible on a user interface represented with a kanban job symbol for each job without the use of scroll bars. The layout may be dependent on the size of the control in which it is hosted, which may be resized by the user. Kanban job symbol sizes may be proportional to the capacity they consume (subject to minimum drawing sizes to ensure proper interactive handling) and consistent across periods, representing proportional amounts of capacity consumed. Kanban job symbols may also include a center icon indicating the job status and an overlay icon to represent additional information like whether the kanban is express or overdue.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for facilitating networked business applications. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. Embodiments are described using visual presentation of process job through kanban job symbols. However, kanban job symbols are not the only way of presenting process job and other, similar presentations may also be implemented using the principles described herein.

FIG. 1 is a conceptual diagram illustrating interactions between a networked business service providing capacity based process job layout distribution. Embodiments may be implemented in hosted services such as Enterprise Resource Planning (ERP) services, which enable recording, analysis, and reporting of business processes or in locally installed applications.

A business service 112 according to embodiments may be executed on one or more servers (e.g., server 114) and employ one or more local or remote data stores (e.g., business data store 116). Business service 112 may perform a variety of tasks such as entry of data, analysis, reporting, presentation, monitoring of business processes, and comparable activities. Business service 112 may perform these tasks through one or more centralized or distributed applications, extensible modules, and so on. As a hosted service, business service 112 may enable access to the provided services through networked connections.

For example, a user may access business service 112 through a client application 106 executed on computing device 102. Client application 106 may be a dedicated application or a generic application such as a browser. Authorization and security processes may be implemented by the business service 112 or a communication service 110, which may enable users to access business service 112 from remote locations.

Client application 106 may enable user interaction through user interface 104. According to some embodiments, production flow activities may be presented through a kanban job symbol of similar graphic layout distribution on user interface 104.

Kanban is a scheduling system that tells users what to produce, when to produce it, and how much to produce. Kanban is an effective tool to support the running of a production system as a whole, while promoting improvements because reducing the number of kanban in circulation highlights problem areas. In a kanban presentation, supply or production is determined according to the actual demand of the customers. Kanban may be used as a demand signal that immediately propagates through the supply chain, which may be employed to ensure that intermediate stocks held in the supply chain are better managed, usually smaller.

Kanban cards are a key component of the kanban system for signaling the need to move materials within a manufacturing or production facility or move materials from an outside supplier to the production facility. The system may also be used for other processes such as software development, project management, and the like. The kanban cards provide a message that signals depletion of product, parts, inventory, or similar resource that when received can trigger the replenishment of that resource. Consumption drives demand for additional resources. Demand for more may be signaled by kanban cards. Lean production and manufacturing approach proposes that demand-driven systems lead to faster turnarounds in production and lower inventory levels, helping companies implementing such systems to be more competitive. Different color, shading, textual, and graphic schemes may be used in conjunction with kanban cards to convey information. For example, a red kanban card may indicate a depleted resource. While kanban systems started out as physical systems with actual cards, software versions can be implemented with even greater flexibility and capabilities.

Figure 2:
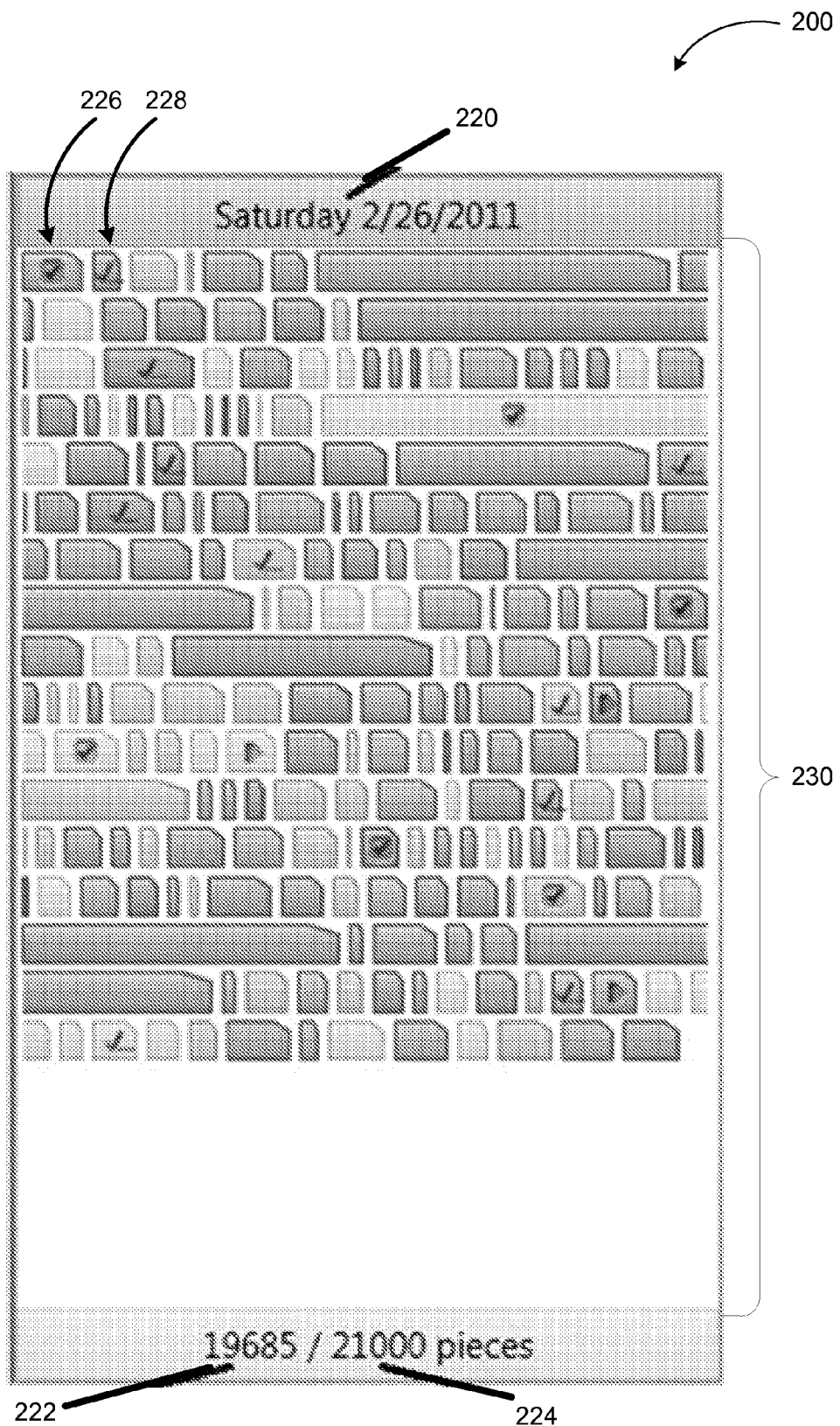
FIG. 2 illustrates an example planning period with a sequence of planned kanban job symbols.

FIG. 2 illustrates an example planning period with a sequence of planned kanban job symbols. The example presentation illustrated in diagram 200 is just an example process job layout distribution. Embodiments are not limited to this example presentation or others discussed below.

A basic unit of a kanban job symbol based system is planning period 220.

Planning period 220 may be a day, a week, a month, a year, or even an hour depending on the monitored process. A user interface according to embodiments may display date and/or time associated with the planning period. A color or similar scheme (such as the background color of the header of the planning period) may convey additional information such as one color representing work days and another color representing weekends or holidays. According to some embodiments, the color or similar scheme may convey even more information. For example, overloaded periods may be indicated with a red background color of the planning period, its header, or footer.

Planned kanban jobs 230 may be filled in the planning period 220 as a sequence of kanban job symbols. Each symbol represents a different job with an amount/length of the process activity/job being reflected in proportion to a size (width) of the card. Further information about the planning period such as consumed capacity 222 and total available capacity 224 may be displayed at a footer of the planning period 220. Other information conveyance schemes may include graphical schemes such as a center icon on the kanbans reflecting job status (e.g., a check mark 226 for completed tasks, a cross 228 for cancelled tasks, and the like). Additionally, another icon on the kanban job symbols (e.g., at a corner of the kanban) may indicate whether the kanban is priority or overdue. Colors of the kanban job symbols may be used to indicate a schedule group (e.g. a product group), an item, an item group, a responsible team, a status of the job, or similar information.

Figure 3:
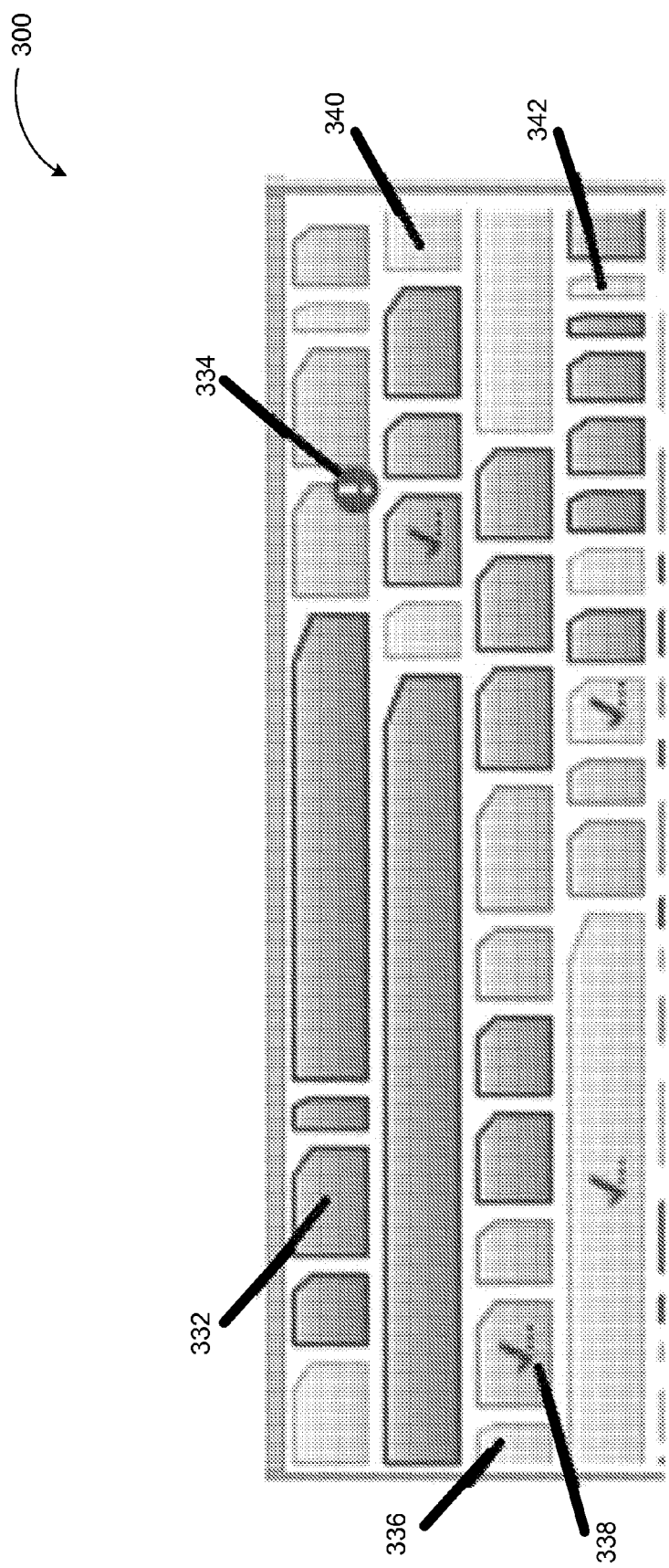
FIG. 3 illustrates example kanban job symbol types and subcomponents that may be used in a capacity based process job layout distribution using kanban job symbols.

FIG. 3 illustrates example kanban job symbol types and subcomponents that may be used in a capacity based kanban job symbol layout distribution. Diagram 300 illustrates some example components that may be used in a kanban planning period to present jobs in a process.

A kanban job symbol may be a single-row kanban job symbol 332 (completely on a single row) or a multi-row kanban job symbol that begins (340) in a row and ends (336) in another. Center icon 338 and overlay icon 334 on the kanbans may convey additional information associated with each kanban job symbol as described above. While a width of each kanban job symbol may represent an amount or length of a job, a minimum width 342 may be used to ensure proper interactive handling.

Figure 4:
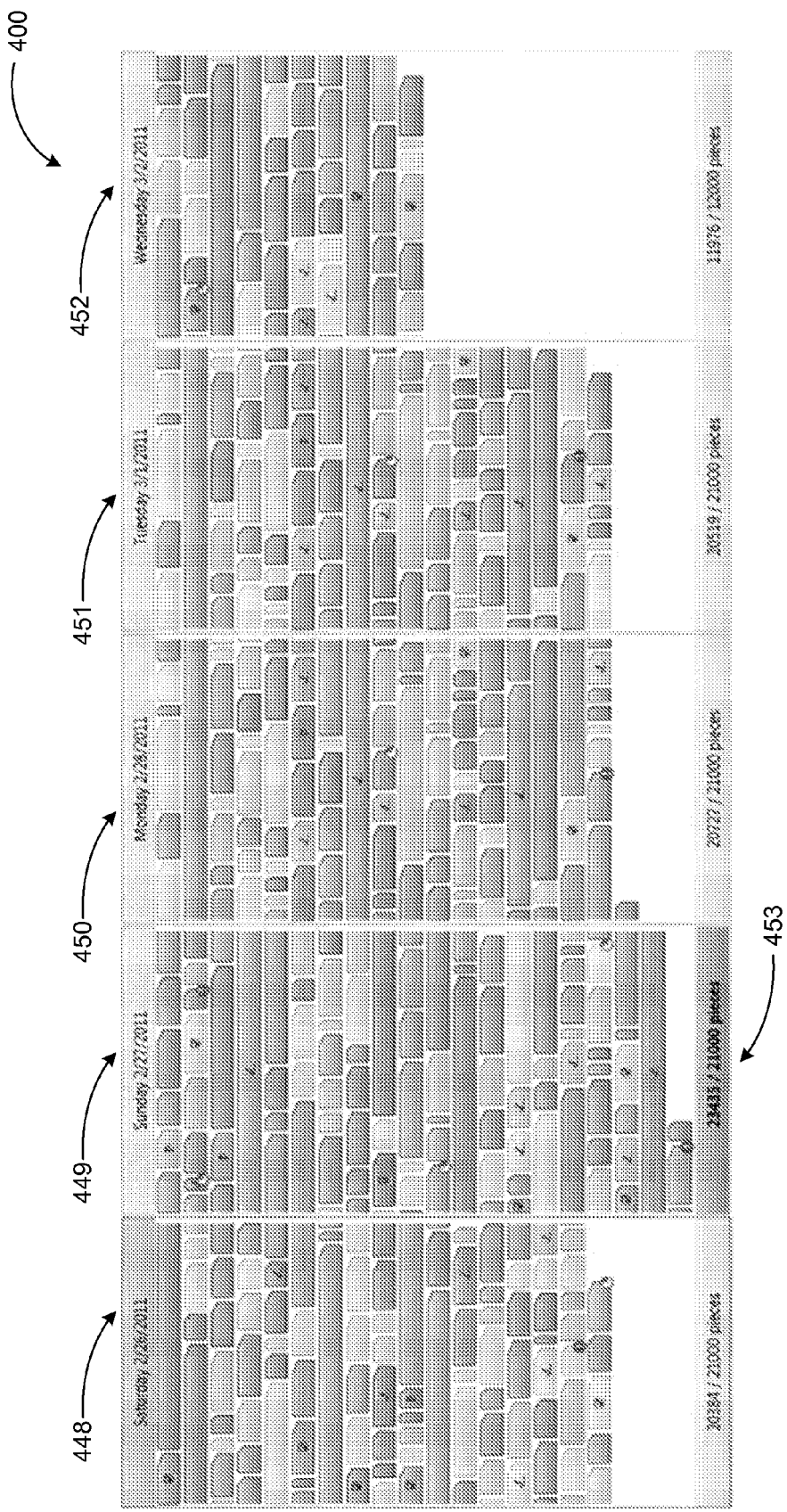
FIG. 4 illustrates an example schedule that includes planning periods with different capacities.

FIG. 4 illustrates an example schedule that includes planning periods with different capacities. Example schedule 400 includes five planning periods 448-452, each period representing a week day. Each planning periods consumed capacity and total available capacity is presented at the bottom (e.g., 453).

In the example schedule 400, each planning period (week day) has different capacities (21000 the first four and 12000 pieces the last one). Of the displayed periods, second planning period 449 (Sunday) is overloaded as indicated by the kanban jobs filling it and the darker color of its footer section alerting a user to the fact.

Figure 5:
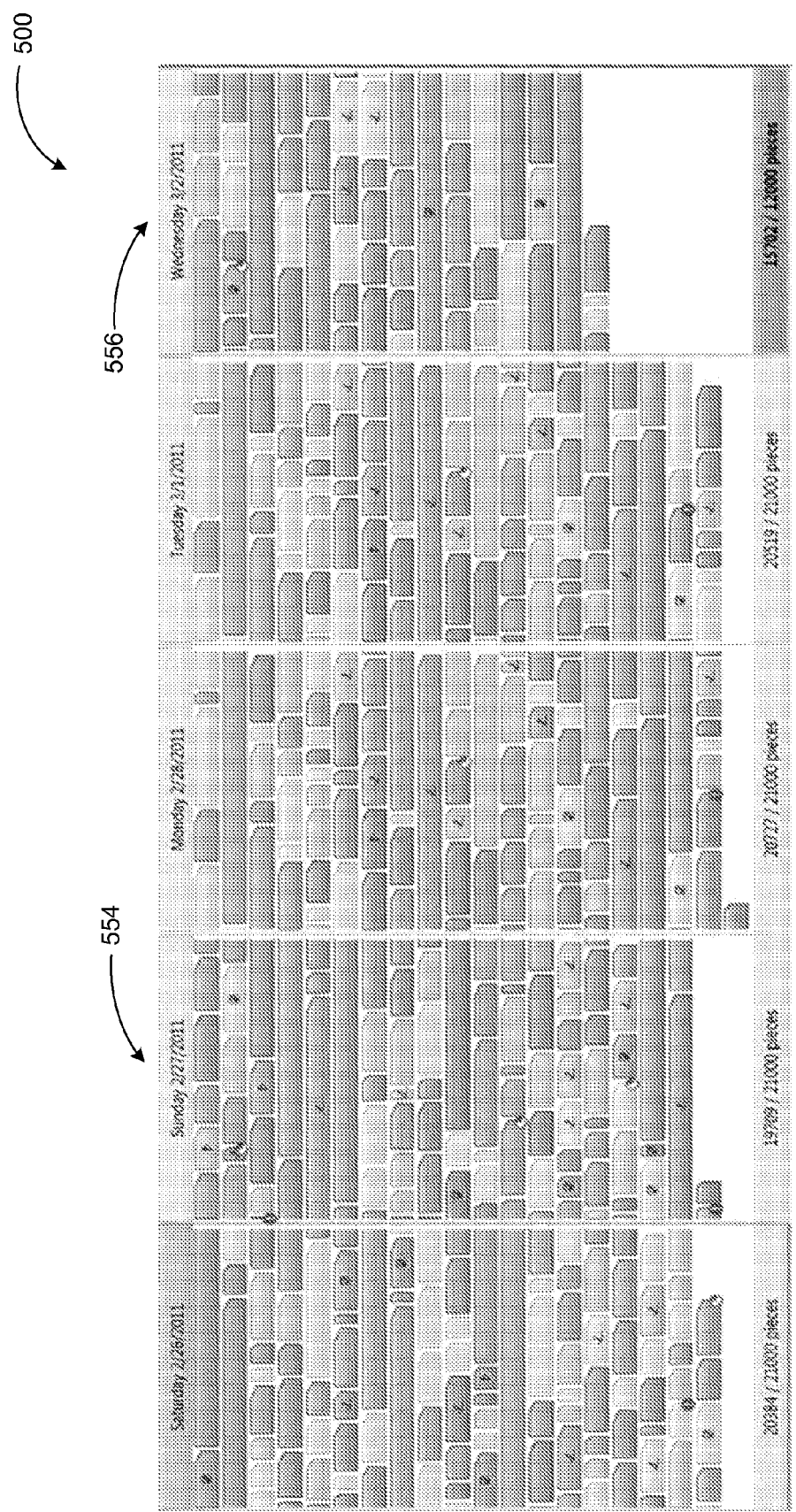
FIG. 5 illustrates another example schedule, where several kanban jobs are moved from the overloaded period of the example schedules of FIG. 4 into another period.

FIG. 5 illustrates example schedules, where several kanban job symbols are moved from the overloaded period of the example schedule of FIG. 4 into another period. In this second example, several kanban jobs are moved from the overloaded period 554 of the previous example schedule 400 (second planning period 449) into the last planning period 556, which is now overloaded even though the kanban jobs do not reach the bottom of the drawing area of the planning period 556. A scale for the rest of the periods is changed and the first four planning periods now approximately match the period available drawing space with the total capacity. The overloaded status of the last planning period 556 is indicated by the darker color of its footer section.

Figure 6:
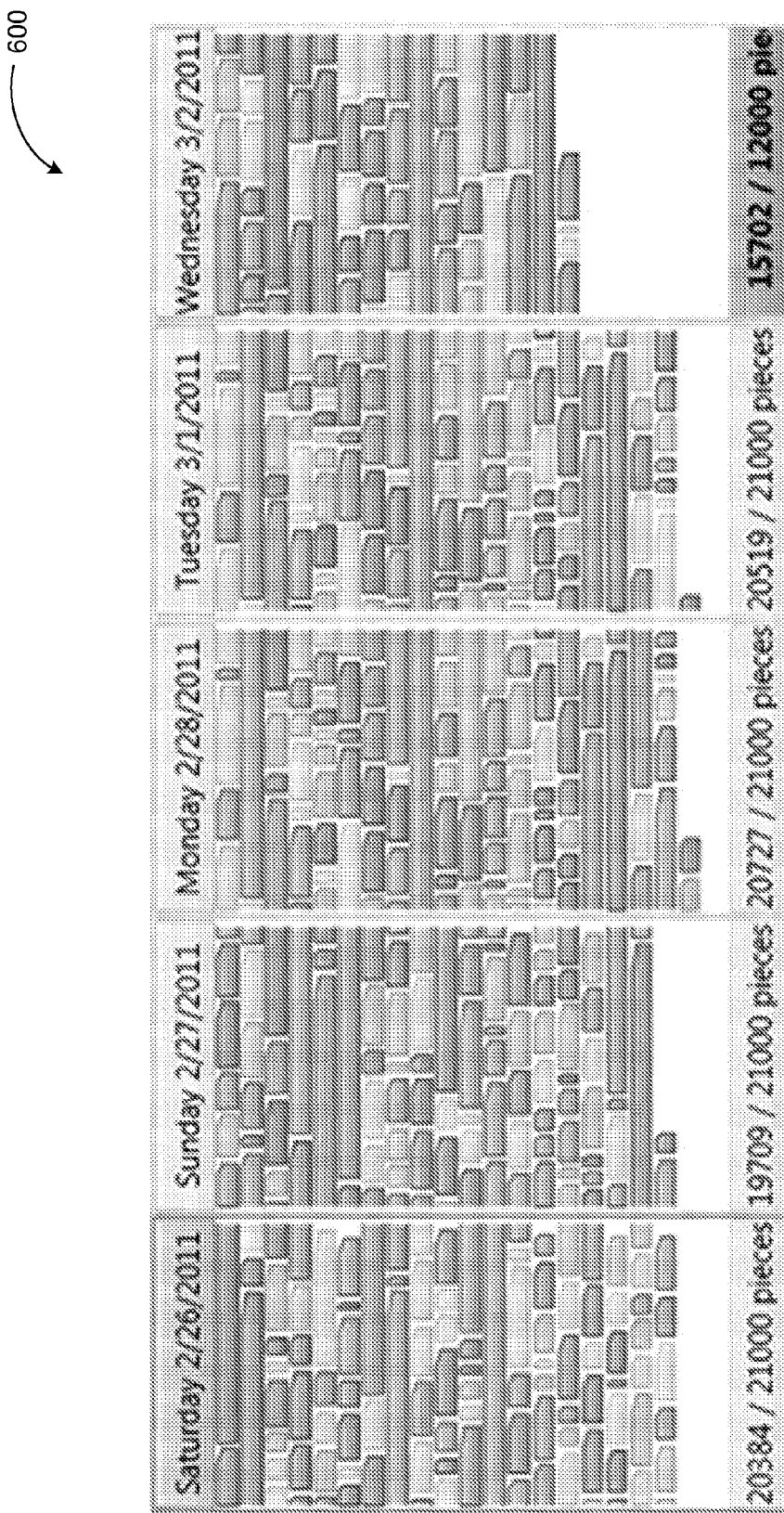
FIG. 6 illustrates an example schedule with varying control size and proportions.

FIG. 6 illustrates an example schedule with varying control size and proportions. The example schedule 600 is based on the same periods and kanban jobs used in the previous example schedules 400 and 500, with different layout based on the control size. In this example, the control and the rows are narrow (e.g., due to an available display area, screen size, etc.). Thus, the center and overlay icons are hidden. Kanban width and height is reduced along with the entire schedule, but a number of the rows is not reduced as it may make some kanban job symbols very small (thin) and unusable. In other embodiments, a larger available display area may result in a larger displayed schedule, where additional information may be displayed such as additional center and/or overlay icons, textual annotations, and so on.

Figure 7:
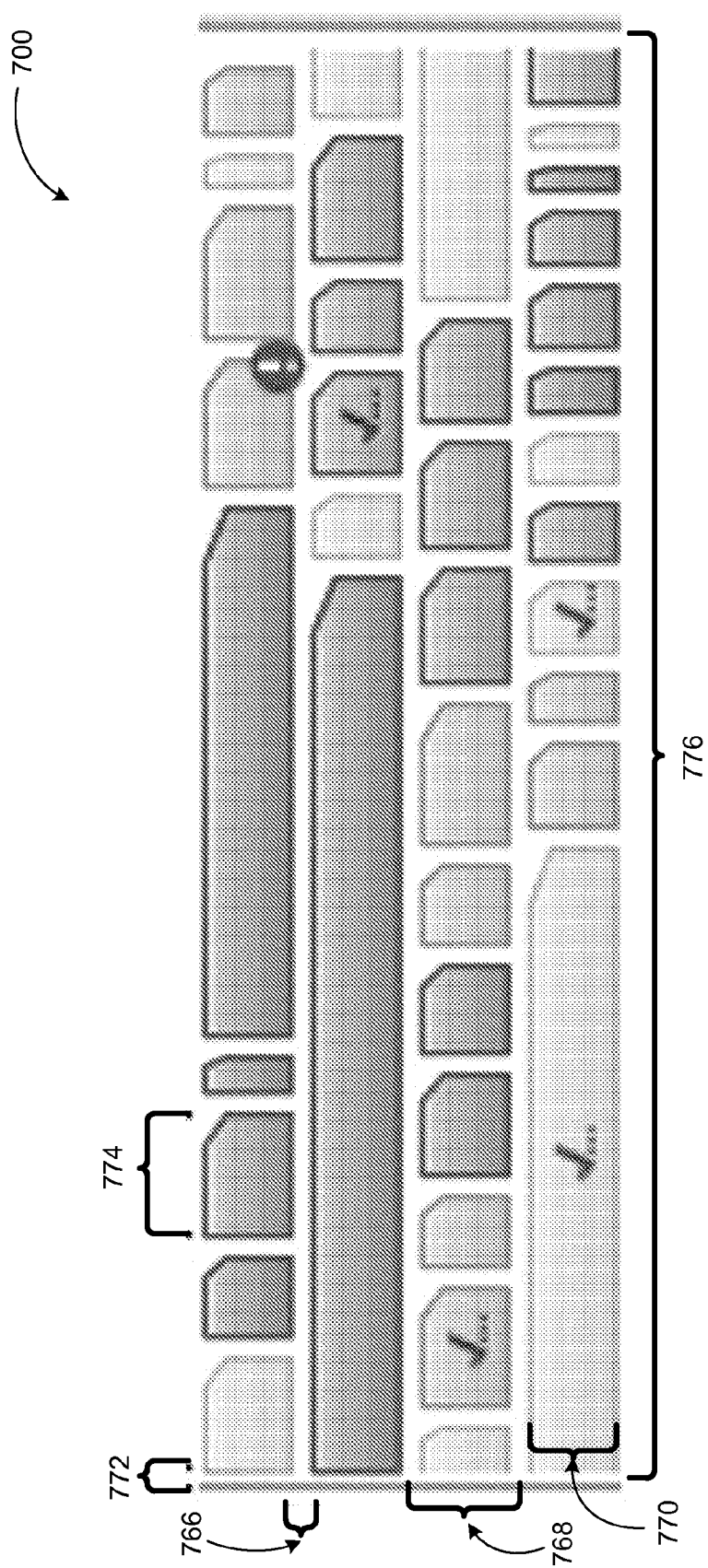
FIG. 7 illustrates layout measures of an example kanban job layout distribution.

FIG. 7 illustrates layout measures of an example kanban layout distribution. An algorithm for displaying capacity based kanban layout may compute placement and size of the graphical elements based on predefined parameters associated with the display, which may be dynamically adjusted based on available display area, screen size, user changes, and comparable aspects.

Some of example parameters may include measures such as horizontal margin 772 defining a distance of the kanban job symbols from a vertical edge of the planning period, vertical margin 766, defining a distance between two rows of kanban job symbols vertical margin 766 defining a row height (consequently limiting a height of the kanban job symbols), kanban job symbol height 770, kanban job symbol width 774, and row available width 776 defining a width of each row, and thereby influencing which kanban job symbols are to be single-row kanbans and which multi-row kanbans. Row height 768 may be defined as kanban job symbol height plus vertical margin. Row available width 776 may be computed as row width −2*horizontal margin.

A layout distribution according to some embodiments may occur in two phases. Calculation of the minimum number of rows needed by each planning period and drawing the layout distribution based on the maximum number of rows needed across planning periods.

In the first phase, the minimum number of rows for each planning period to display the kanban jobs may be computed in isolation according to period capacity. This number of rows ensures that the kanbans in a period can be drawn proportional to the capacity they consume, and also to the total available capacity of the period (or more if the period is overloaded, as all the kanbans are to be displayed). The process may apply to each planning period in isolation.

The number of rows may be calculated given the layout dimensions, the total capacity available in the planning period, and the capacity consumed by each kanban in the period among other layout parameters. Vertical and horizontal margins may be considered, as well as minimum kanban sizes to ensure kanban job symbols are big enough to be clickable. A maximum row height may also be applied to avoid drawing kanban job symbols that have a very high height and very thin width, increasing the number of rows if needed.

A multi-row kanban job symbol is a kanban job symbol that needs to be split across two or more rows because it cannot be drawn within the same row it starts. That may occur because the kanban job has a capacity higher than the capacity represented by each row, or because the kanban job starts to be drawn close to the right edge and does not fit completely in the remaining width of the current row. A minimum width (equivalent to the minimum kanban job symbol width) may be enforced in each of the multi-row kanban job symbol fragments (in case they start or end very close to the edges). This may affect the amount of width that may be potentially needed. To prevent the complete layout running out of drawing space due to the additional width added, rows may be assumed to be affected by this scenario to ensure that all kanbans are visible when calculating the final number of rows.

In the second phase, the layout distribution may be drawn based on the maximum number of rows needed across planning periods. The minimum number of rows each period needs to draw its kanbans computed in the first phase may be used to determine the maximum number of these rows and supplied to the different periods so that they can be drawn, the kanbans they represent are proportional to the capacity they consume across periods, other requirements (e.g., minimum kanban sizes, all kanbans visible, etc.) are met.

The layout may be calculated period by period given the number of rows agreed to show across periods. The algorithm may calculate a ratio between a unit of capacity consumed and screen units equivalent to the capacity to fit the layout constraints. Then, the layout may be drawn kanban by kanban including their icons (center and overlay), respecting the margins and splitting kanbans into multi-row kanbans as needed when reaching the edges of the row.

The different processes, kanban distributions, and systems discussed in FIG. 1 through FIG. 7 may be implemented using distinct hardware modules, software modules, or combinations of hardware and software. Furthermore, such modules may perform two or more of the processes in an integrated manner While some embodiments have been provided with specific examples for capacity based kanban distribution, embodiments are not limited to those. Indeed, embodiments may be implemented in various systems using a variety of elements, configurations, schemes, etc. and with additional or fewer features using the principles described herein.

Figure 8:
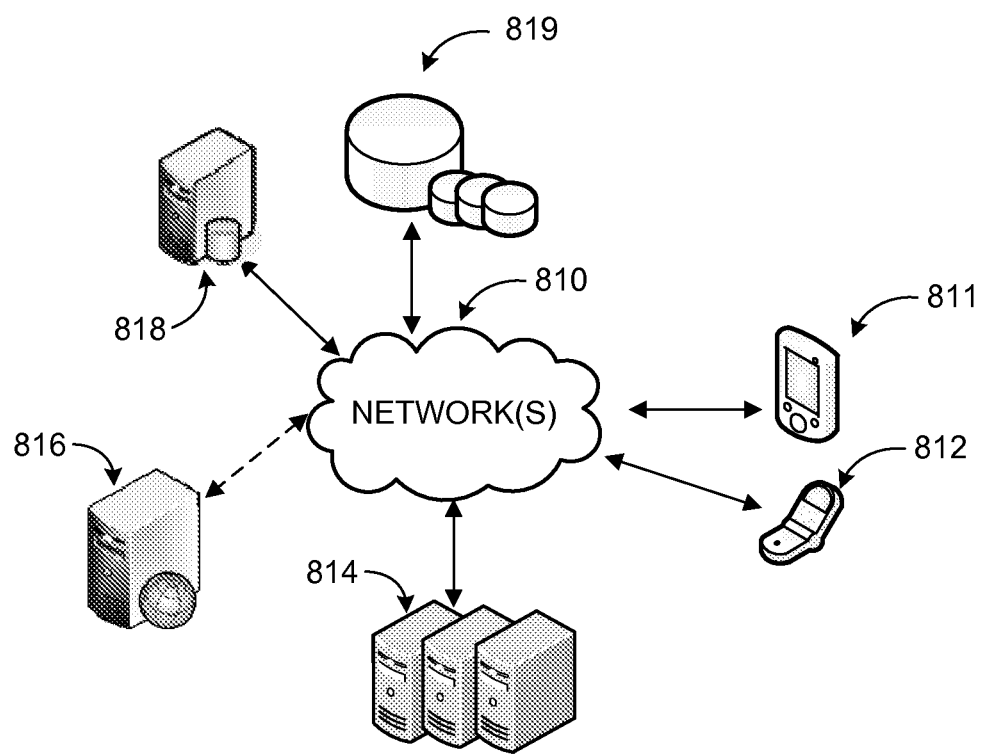
FIG. 8 is a networked environment, where a system according to embodiments may be implemented.

FIG. 8 is an example networked environment, where embodiments may be implemented. A platform for providing business services that include capacity based kanban layout distribution may be implemented via software executed over one or more servers 814 such as a hosted service. The platform may communicate with client applications on individual mobile devices such as a smart phone 811, cellular phone 812, or similar devices ('client devices') through network(s) 810.

Client applications executed on any of the client devices 811-812 may interact with a hosted service providing kanban layout distribution services from the servers 814, or on individual server 816. The hosted service may provide multi-faceted services such as accounting, resource management, etc. As part of the provided services, production flows/processes may be presented using kanban distributions as described above. Some or all of the processing associated with the kanban layout distribution may be performed at one of more of the servers 814 or 816. Relevant data such as tasks, jobs, capacity, deadlines, and similar data may be stored and/or retrieved at/from data store(s) 819 directly or through database server 818.

Network(s) 810 may comprise any topology of servers, clients, Internet service providers, and communication media. A system according to embodiments may have a static or dynamic topology. Network(s) 810 may include secure networks such as an enterprise network, an unsecure network such as a wireless open network, or the Internet. Network(s) 810 may also include (especially between the servers and the mobile devices) cellular networks. Furthermore, network(s) 810 may include short range wireless networks such as Bluetooth or similar ones. Network(s) 810 provide communication between the nodes described herein. By way of example, and not limitation, network(s) 810 may include wireless media such as acoustic, RF, infrared and other wireless media.

Many other configurations of computing devices, applications, data sources, and data distribution systems may be employed to implement a platform providing capacity based kanban layout distribution. Furthermore, the networked environments discussed in FIG. 8 are for illustration purposes only. Embodiments are not limited to the example applications, modules, or processes.

Figure 9:
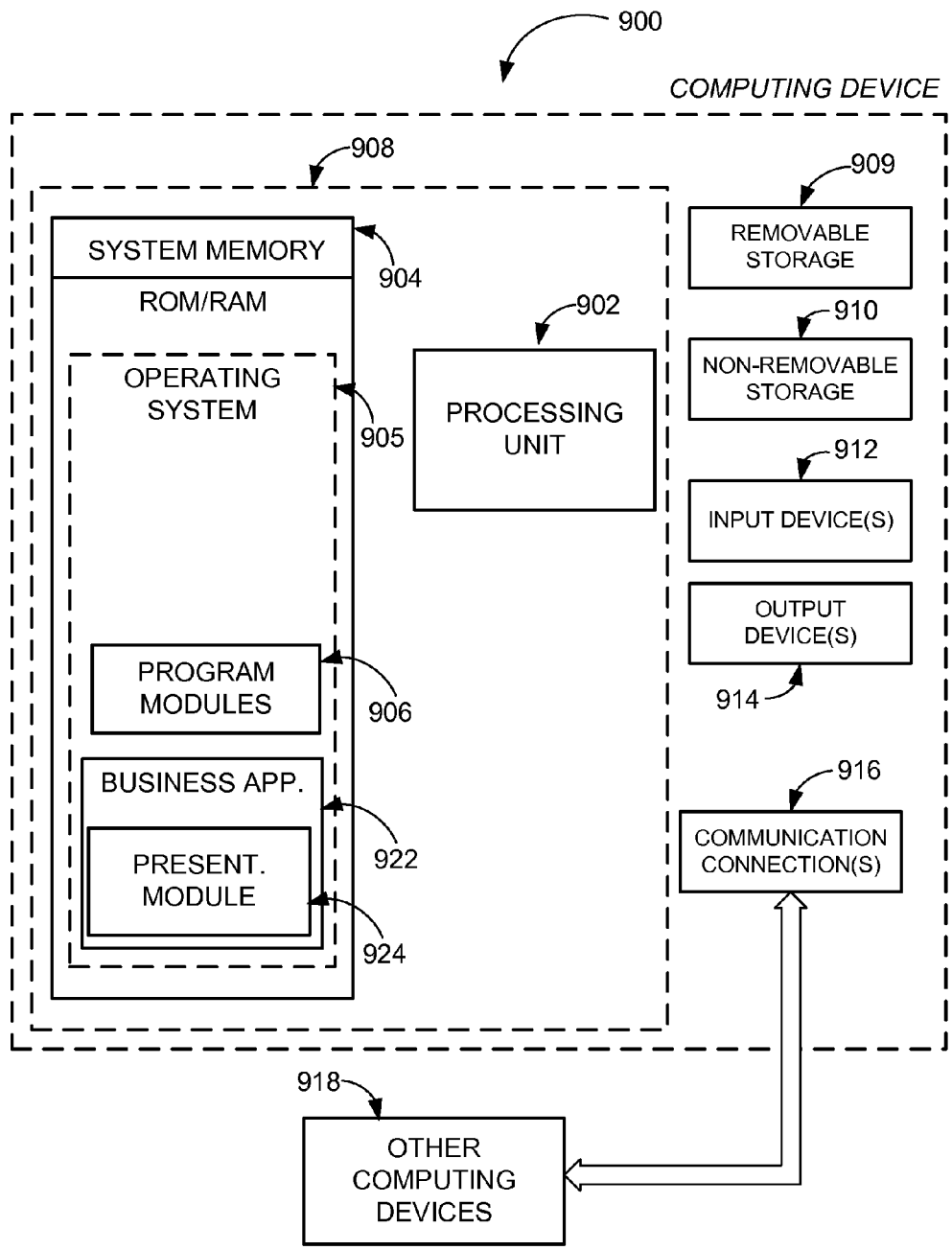
FIG. 9 is a block diagram of an example computing operating environment, where embodiments may be implemented.

FIG. 9 and the associated discussion are intended to provide a brief, general description of a suitable computing environment in which embodiments may be implemented. With reference to FIG. 9, a block diagram of an example computing operating environment for an application according to embodiments is illustrated, such as computing device 900. In a basic configuration, computing device 900 may be a server or similar computing device capable of providing process presentation through kanban layout distribution according to embodiments and include at least one processing unit 902 and system memory 904. Computing device 900 may also include a plurality of processing units that cooperate in executing programs. Depending on the exact configuration and type of computing device, the system memory 904 may be volatile (such as RAM), non-volatile (such as ROM, flash memory, etc.) or some combination of the two. System memory 904 typically includes an operating system 905 suitable for controlling the operation of the platform, such as the WINDOWS®, or similar operating systems from MICROSOFT CORPORATION of Redmond, Wash. or similar ones. The system memory 904 may also include one or more software applications such as program modules 906, business application 922, and presentation module 924.

Business application 922 may provide a variety of services including presentation of production flows and processes. Presentation module 924 may manage computation and presentation of kanban layouts taking into consideration capacity aspects. This basic configuration is illustrated in FIG. 9 by those components within dashed line 908.

Computing device 900 may have additional features or functionality. For example, the computing device 900 may also include additional data storage devices (removable and/or non-removable) such as, for example, magnetic disks, optical disks, or tape. Such additional storage is illustrated in FIG. 9 by removable storage 909 and non-removable storage 910. Computer readable storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 900. Any such computer readable storage media may be part of computing device 900. Computing device 900 may also have input device(s) 912 such as keyboard, mouse, pen, voice input device, touch input device, and comparable input devices. Output device(s) 914 such as a display, speakers, printer, and other types of output devices may also be included. These devices are well known in the art and need not be discussed at length here.

Computing device 900 may also contain communication connections 916 that allow the device to communicate with other devices 918, such as over a wired or wireless network in a distributed computing environment, a satellite link, a cellular link, a short range network, and comparable mechanisms. Other devices 918 may include computer device(s) that execute communication applications, other servers, and comparable devices. Communication connection(s) 916 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 10:
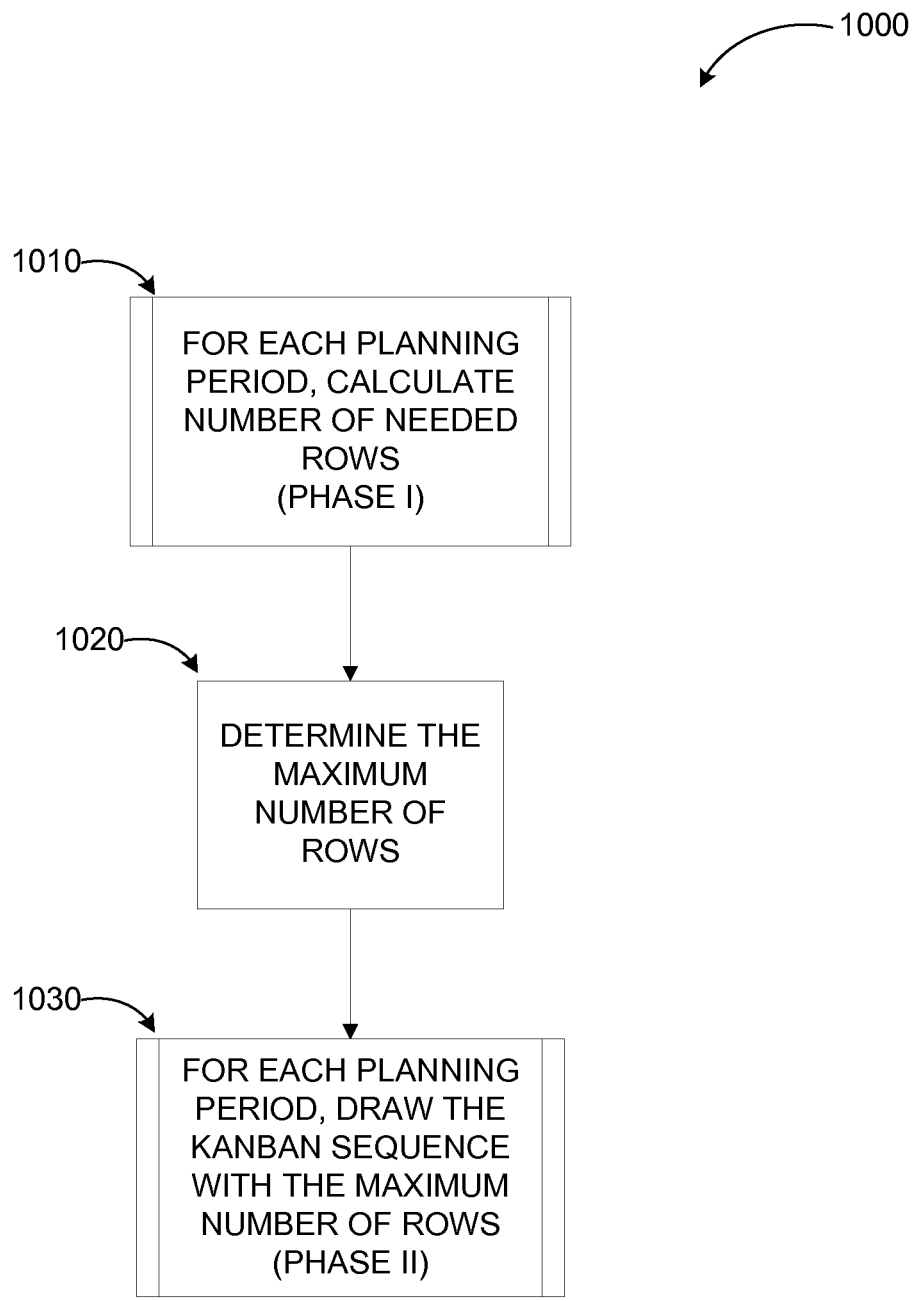
FIG. 10 illustrates a flowchart for a process of computing and laying out a process job layout distribution according to embodiments.

FIG. 10 illustrates a flowchart for a process of computing and laying out a kanban layout distribution according to embodiments. Process 1000 may be implemented by a business service or application on a server or client device to present a process visually through kanban job symbols.

Process 1000 may begin with operation 1010, where a number of needed rows for each planning period are computed, also referred to as phase 1 of the process. Operation 1010 may be followed by operation 1020, where a maximum number of rows is determined based on the phase 1 computation of number of rows needed for each planning period. At operation 1030, the presented production flow/process may be drawn with the maximum number of rows for each planning period in phase 2 of the process.

Figure 11A:
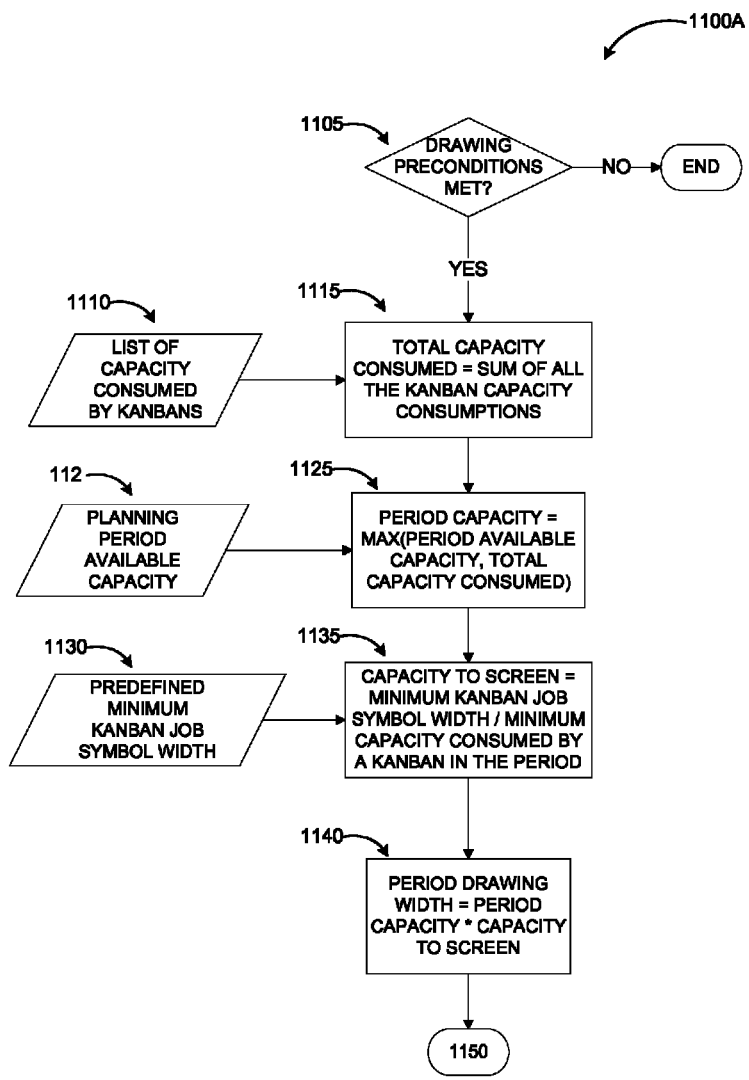
FIGS. 11A and 11B illustrate a flowchart for computation of a minimum number of rows needed by each planning period in isolation according to period capacity.
Figure 11B:
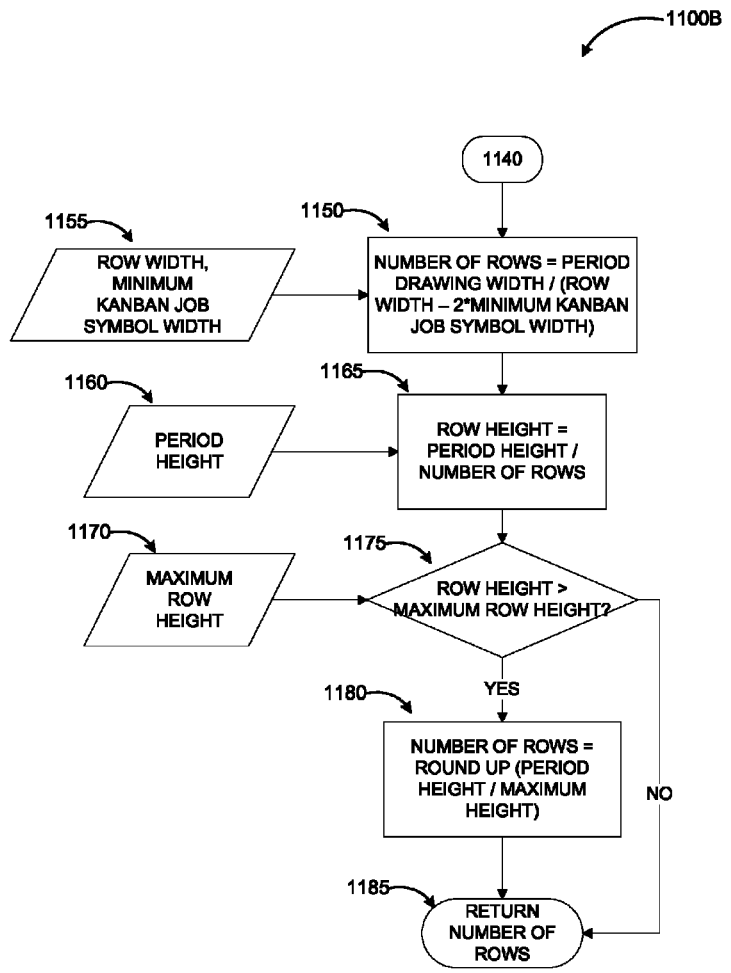

FIGS. 11A and 11B illustrate a flowchart for computation of a minimum number of rows needed by each planning period in isolation according to period capacity. The details of the phase 1 of the process 1000 are illustrated by processes 1100A or 1100B.

In process 1100A, first the algorithm may ensure that the preconditions for drawing are met at decision operation 1105. If the preconditions are not met, there is no need to proceed, and the process may end. If there are kanban jobs in the period, the total capacity consumed in the period may be computed at operation 1115 with input from a list of capacity consumed by kanban jobs 1110. The total capacity consumed in the period is equal to the sum of the capacity consumed by the kanban jobs contained in the planning period. With input from planning period available capacity 1120, the planning period capacity may be computed in operation 1125 to consider for drawing as the maximum of: total capacity available in the period and total capacity consumed in the period.

With input from predefined minimum kanban job symbol width 1130, an initial capacity to screen ratio may be determined at operation 1135. The initial capacity to screen ratio may assume that smallest kanban (the one that consumes the minimum capacity) fits the minimum kanban job symbol width. This ensures that capacity differences can be clearly seen even when the consumption is very small (as a result, there may be more rows with wider kanbans in those scenarios). At operation 1140, the total period drawing width may be determined as the total capacity for drawing the period multiplied by the capacity to screen ratio.

Process 1100A may continue with operation 1150 of process 1100B, where the number of rows needed is determined by dividing the total period drawing width by the row width minus twice the minimum kanban job symbol width (to cover for potential width increases due to cutting kanban job symbols in each edge). Row width and minimum kanban job symbol width may be provided as input 1155 to this operation. With period height provided as input 1160, the row height may be determined at operation 1165 by dividing the period height by the number of rows.

Maximum row height may be provided at input 1170 to decision operation 1175, where if the row height is determined to be less than the maximum predefined row height (rows are too tall), the number of rows are returned (1185). If the row height is determined to be greater than the maximum predefined row height, the period height may be divided by the maximum height to obtain a new number of rows at operation 1180, and a new row height calculated within the maximum.

Figure 12:
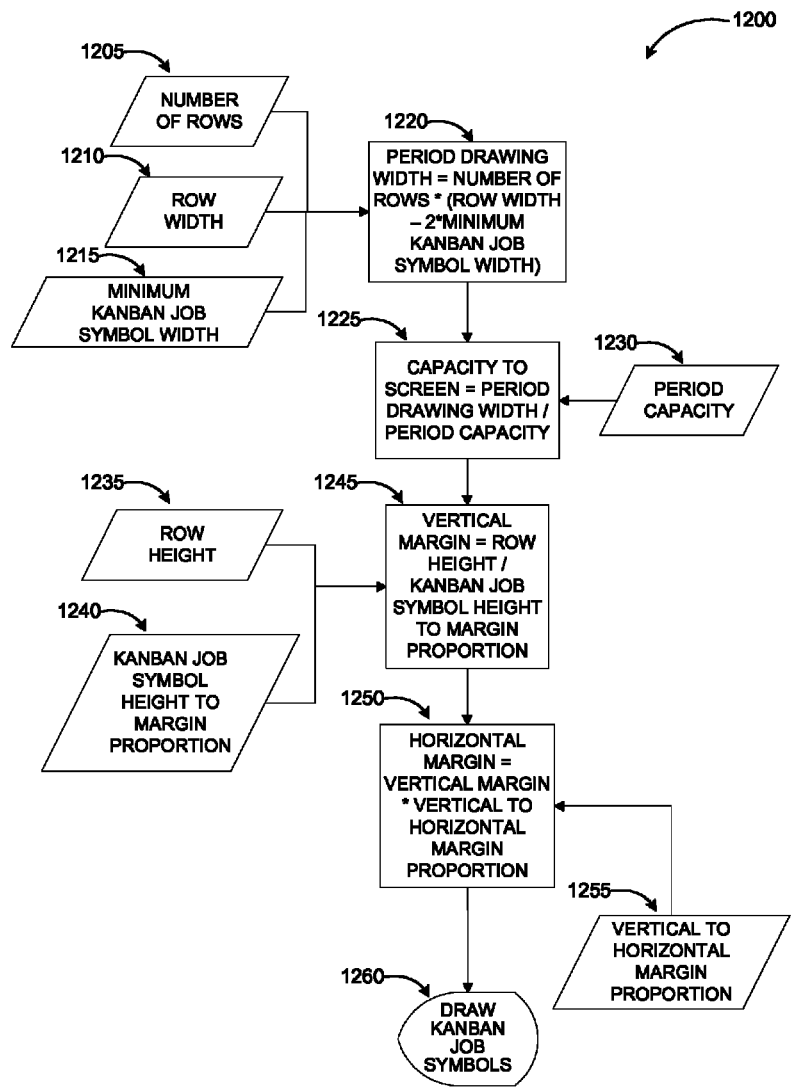
FIG. 12 illustrates a flowchart for drawing the layout distribution based on the maximum number of rows needed across planning periods.

FIG. 12 illustrates a flowchart for drawing the layout distribution based on the maximum number of rows needed across planning periods. Process 1200 represents the second phase of the process 1000 and begins with operation 1220, which receives as input number of rows 1205, row width 1210, and minimum kanban job symbol width 1215. At operation 1220, the total period drawing width may be determined as the number of rows multiplied by the row width (period row width minus twice the minimum kanban job symbol width to ensure that split kanban job symbols in the edges still fit).

Operation 1220 may be followed by operation 1225 receiving period capacity as input 1230. At operation 1225, the capacity to screen ratio may be determined by dividing the total period drawing width by the total capacity consumed in the period. Row height 1235 and kanban job symbol height to margin proportion 1240 may be provided as input to operation 1245, where the vertical margin between kanban job symbol rows may be computed by dividing the row height by a kanban job symbol height to margin predefined proportion. It will be used during kanban job symbol drawing. With vertical to horizontal margin proportion 1255 as input, the horizontal margin may be determined at operation 1250 respecting a minimum horizontal margin after the calculations.

At operation 1260, the kanban job symbols may be drawn. The drawing algorithm may traverse the planning period updating a point coordinate that represents the top-left corner of the next kanban job symbol to be drawn. Starting with the top-left corner of the period (0, 0) following procedure may be applied.

The shape of the kanban job symbol may be drawn given its top-left coordinate, and the top-left coordinate returned of the new kanban job symbol. The available width in the current row may be determined as total width minus margin and minus left coordinate. If the available width is less than the minimum kanban job symbol width, the process may move to the next row (updating top by adding the row height and resetting left). If the kanban job symbol width fits the available width, its shape may be drawn and the new adjusted top-left coordinate returned.

If the kanban job symbol width does not fit, the beginning of the kanban job symbol (the remaining row width) may be drawn and the process may move to the next row. If needed, as many intermediate rows as needed may be drawn by subtracting the remaining kanban job symbol width to draw by the available width per row. The final part of the kanban job symbol may then be drawn and the new adjusted top-left coordinate returned.

Next, a center icon may be drawn if applicable, based on the top-left coordinates of both the current kanban job symbol and the next one. For this, the center of the kanban job symbol may be calculated. If the kanban job symbol is in a single row, the center width may be calculated. If the kanban job symbol is multi-row, different paths may be taken. If the kanban job symbol expands over two rows and the larger part is in the first row, the center of the upper part may be computed. If the kanban job symbol expands over two rows and the larger part is in the last row, the center of the lower part may be computed. If the kanban job symbol expands over more than two rows, a center row may be selected rounding down and its center calculated. Then, the icon may be drawn with the icon center in the kanban job symbol center.

The overlay icon may be drawn, if applicable, based on the top-left coordinates of both the current kanban job symbol and the next one. The icon may be drawn in the lower right (or any other corner) of the kanban job symbol by subtracting the icon width from the next kanban job symbol left coordinate (or other relevant coordinate), and in the bottom of the row given by the next kanban job symbol top coordinate. The top-left coordinates of the current kanban job symbol may be updated with the ones of the next kanban job symbol and repeats the process until finished.

The operations included in processes 1000 through 1200 are for illustration purposes. Capacity based process flow layout distribution may be implemented by similar processes with fewer or additional steps, as well as in different order of operations using the principles described herein. Furthermore, a process flow may be visualized using other graphic schemes than kanban symbols.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for presenting a production flow employing capacity based kanban jobs, the method comprising:
   for each planning period in a schedule, computing a number of needed rows at a processor of the computing device executing a business application;
   determining a maximum number of rows based on the number of needed rows at the processor; and
   displaying the schedule at a display device associated with the computing device by filling each planning period with kanban job symbols representing one of individual tasks and resources based on the maximum number of rows, wherein a vertical margin for each planning period is determined based on a ratio of a row height and a kanban job symbol height to margin proportion and a horizontal margin for each planning period is determined based on a product of the vertical margin and a vertical margin to horizontal margin proportion.

2. The method of claim 1, further comprising:
   drawing the planning periods on the display device based on at least one from a set of: a horizontal margin, a vertical margin, a kanban job symbol width, a kanban job symbol height, a row height, and a row available width.

3. The method of claim 1, further comprising:
   drawing the kanban job symbols on the display device such that a size of each kanban job symbol is consistent across planning periods representing proportional amounts of capacity consumed.

4. The method of claim 3, further comprising:
   enforcing a minimum drawing size for the kanban job symbols.

5. The method of claim 1, further comprising:
   displaying at least one of a center icon and an overlay icon on a portion of the kanban job symbols on the display device conveying status information associated with the kanban job symbols.

6. The method of claim 5, further comprising in response to one of: an available display area, a screen size, and a user selection:
   dynamically resizing the planning periods and the kanban job symbols; and
   one of displaying and hiding center icons and overlay icons.

7. The method of claim 5, wherein the center icon indicates one of a job status and a resource status, and the overlay icon indicates one of a kanban job being priority and the kanban job being overdue.

8. The method of claim 1, further comprising:
   displaying a consumed capacity and a total available capacity of each planning period on the display device; and
   displaying the kanban job symbols without using scrollbars on the display device.

9. The method of claim 1, wherein at least one of the planning periods in the schedule have a different total available capacity than other planning periods in the schedule.

10. The method of claim 1, further comprising:
    presenting additional information associated with the production flow on the display device employing at least one from a set of: a color scheme, a graphic scheme, a shading scheme, and a textual scheme in conjunction with the kanban job symbols.

11. A computing device executing a business service capable of presenting a production flow employing capacity based kanban jobs, the computing device comprising:
    a memory; and
    a processor coupled to the memory, the processor adapted to execute a presentation application that is configured to:
    for each planning period in a schedule, compute a number of needed rows by dividing a planning period width by a difference of a row width and two times a minimum kanban job symbol width;
    compute a row height based on a ratio of a planning period height and the number of needed rows;
    determine a maximum number of rows based on the number of needed rows; and
    draw the schedule by filling each planning period with kanban job symbols representing one of individual activities based on the maximum number of rows such that a size of each kanban job symbol is consistent across planning periods representing proportional amounts of capacity consumed.

12. The computing device of claim 11, wherein the processor is further configured to:
    compute a period capacity for each planning period based on a maximum of a period available capacity and a total consumed capacity, wherein the total consumed capacity is determined based on a sum of all kanban job capacity consumptions within each planning period.

13. The computing device of claim 12, wherein the processor is further configured to:
    compute a planning period width based on a product of the period capacity and a capacity of a user interface displaying the schedule, wherein the capacity of the user interface is determined from a ratio of the minimum kanban job symbol width to a minimum capacity consumed by a kanban job in the planning period.

14. The computing device of claim 11, wherein the processor is further configured to:
    if the computed row height is less than a predefined maximum row height, return the number of needed rows for drawing the schedule; else
    update the number of needed rows based on rounding up a ratio of the period height and a maximum height, and return the updated number of needed rows for drawing the schedule.

15. The computing device of claim 11, wherein a vertical margin for each planning period is determined based on a ratio of a row height and a kanban job symbol height to margin proportion.

16. The computing device of claim 15, wherein a horizontal margin for each planning period is determined based on a product of the vertical margin and a vertical margin to horizontal margin proportion.

17. The computing device of claim 16, wherein the processor is further configured to:
draw the schedule using the horizontal margin, the vertical margin, a period width, and a capacity of a user interface displaying the schedule.

18. A method executed on a computing device for presenting a production flow employing capacity based kanban jobs, the method comprising:
for each planning period in a schedule, computing a number of needed rows by dividing the planning period width by a difference of a row width and two times a minimum kanban job symbol width at a processor of the computing device;
computing a row height based on a ratio of a planning period height and the number of needed rows at the processor;
if the computed row height is less than a predefined maximum row height, returning the number of needed rows for drawing the schedule; else
updating the number of needed rows based on rounding up a ratio of the period height and a maximum height, and return the updated number of needed rows for drawing the schedule at the processor;
determining a maximum number of rows based on the number of needed rows at the processor;
displaying the schedule by drawing the planning periods on a display device associated with the computing device based on at least one from a set of: a horizontal margin, a vertical margin, a kanban job symbol width, a kanban job symbol height, a row height, and a row available width, wherein each planning period is filled with kanban job symbols representing one of individual activities based on the maximum number of rows and a size of each kanban job symbol is consistent across planning periods representing proportional amounts of capacity consumed; and
enforcing a minimum drawing size for the kanban job symbols.

19. The method of claim 18, further comprising:
displaying at least one of a center icon and an overlay icon on one or more kanban job symbols conveying status information associated with the at kanban job symbols on the display device;
presenting additional information associated with the production flow on the display device employing at least one from a set of: a color scheme, a graphic scheme, a shading scheme, and a textual scheme in conjunction with the center icons, overlay icons, and kanban job symbols.

* * * * *